United States Patent [19]
Grenci

[11] 4,055,883
[45] Nov. 1, 1977

[54] METHOD AND APPARATUS FOR REMOVING COLLARS FROM COMPRESSED GAS CYLINDERS

[76] Inventor: Carl A. Grenci, 4791 Lesa Place, Yorba Linda, Calif. 92686

[21] Appl. No.: 708,998

[22] Filed: July 26, 1976

[51] Int. Cl.² .......... B23P 19/02

[52] U.S. Cl. .......... 29/427; 29/252; 29/283.5; 72/389; 72/391; 72/453.15

[58] Field of Search .......... 29/426, 427, 251, 252, 29/200 B, 200 D, 283.5; 72/455, 456, 453.14, 453.15, 453.16, 453.18, 386, 389, 391, 380

[56] References Cited

U.S. PATENT DOCUMENTS

| | | | |
|---|---|---|---|
| 443,030 | 12/1890 | Wood | 72/453.18 |
| 2,182,663 | 12/1939 | Eby et al. | 72/453.15 X |
| 3,267,717 | 8/1966 | Reischer | 72/453.15 X |
| 3,554,000 | 1/1971 | Schwab | 72/453.15 |
| 3,711,925 | 1/1973 | Mazer | 29/252 |

*Primary Examiner*—Victor A. DiPalma
*Attorney, Agent, or Firm*—Philip M. Hinderstein

[57] ABSTRACT

A method and apparatus for removing collars from compressed gas cylinders by applying a lateral force on first opposite sides of the collar, the force having a magnitude sufficient to collapse the side walls of the collar, in the direction of the applied force and to elongate the side walls of the collar in a direction perpendicular to the direction of the applied force and repeating the above step on second opposite sides of the collar displaced by approximately 90° from the first sides, the second step freeing the collar from the cylinder neck allowing its easy removal.

6 Claims, 3 Drawing Figures

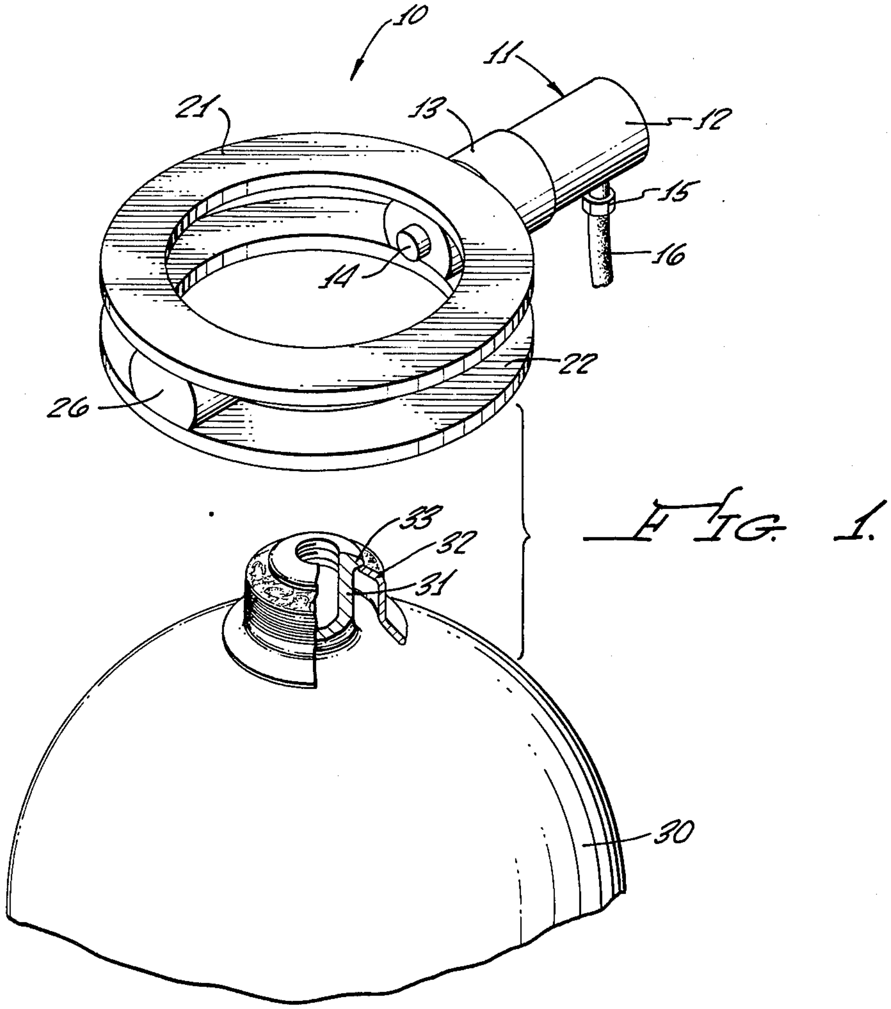
FIG. 1.
FIG. 2.
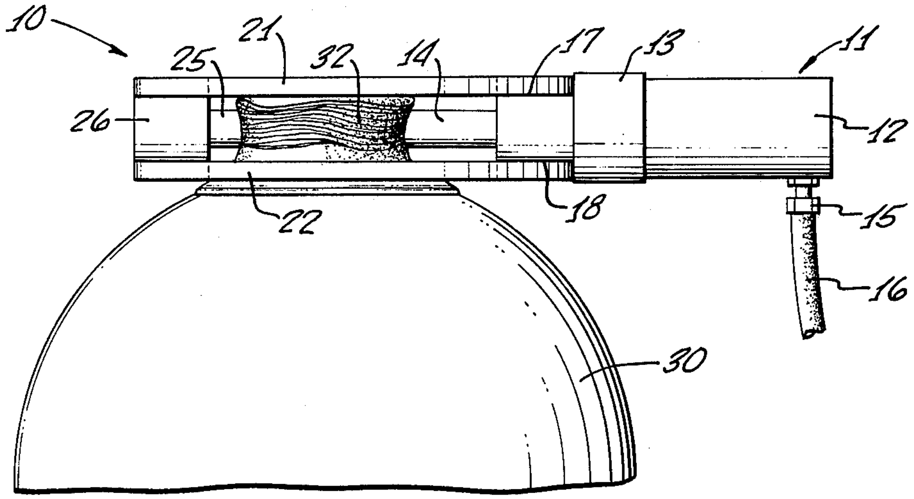

METHOD AND APPARATUS FOR REMOVING COLLARS FROM COMPRESSED GAS CYLINDERS

BACKGROUND OF THE INVENTION

1. Field of the Invention

The present invention relates to a method and apparatus for removing collars from compressed gas cylinders and, more particularly, to a simple and rapid method and apparatus for removing collars from compressed gas cylinders which virtually eliminates the possibility of damaging the cylinder in any way.

2. Description of the Prior Art

In the field of compressed gas cylinders, it is common to place a cylinder collar on the top of the cylinder, the cylinder collar serving the function of identifying the owner of the cylinder whose name appears on the collar. While the collar will remain on the cylinder and not normally be removed therefrom, the need to remove the collar does in fact arise, primarily as necessitated by change in ownership of the cylinder.

Such a collar is generally put on a cylinder by being placed down over the neck of the cylinder, whereupon the metal on the top of the cylinder is swaged over the cylinder to lock it in place. Such technique for connecting the collar to the cylinder makes it difficult to subsequently remove the collar. Presently, collars are chiseled off, beat off with a hammer, severed with a cutting torch, pierced with hole saws, cut with abrasive discs, and pulled off hydraulically.

All of the preceding methods are slow and very time consuming and present the possibility of damaging the cylinder itself. Accordingly, there is a need for a simple technique for removing cylinder collars, one which can be done rapidly without the possibility of damaging the cylinder. Heretofore, such a technique has been unavailable.

SUMMARY OF THE INVENTION

According to the present invention, there is provided a simple and rapid technique for removing cylinder collars from compressed gas cylinders. The present technique is a two-step operation which can normally be done in approximately 30 seconds or less. Furthermore, the present technique virtually eliminates any possibility of damaging the cylinder itself.

Briefly, and in accordance with the present invention, there is provided a tool including a hydraulically driven ram and a fixed ram positioned in facing, spaced, coaxial relationship, the normal spacing between the fixed and driven rams being such as to permit the location of a cylinder collar therebetween. With a cylinder collar so positioned, the tool is activated to apply a lateral force to first opposite sides of the cylinder collar, at two points approximately 180° apart. The ends of the rams have sufficiently large surface areas to prevent penetration of the rams into the side walls of the collar. On the other hand, the force has a magnitude and the rams are of a shape such that the side walls of the collar are collapsed in the direction of the applied force and are elongated in a direction perpendicular to the direction of the applied force. The powered ram is then released and the tool is rotated 90° and actuated again. This applies a second lateral force to second opposite sides of the collar, at two points approximately 180° apart and approximately 90° from the first two points. The second step opens up the first sides of the collar, freeing the collar from the cylinder neck and allowing its easy removal.

OBJECTS

It is therefore an object of the present invention to provide a method for removing collars from compressed gas cylinders.

It is a further object of the present invention to provide apparatus for removing collars from compressed gas cylinders.

It is a still further object of the present invention to provide a method and apparatus for removing collars from compressed gas cylinders which permits a collar to be removed simply and rapidly.

It is another object of the present invention to provide a method and apparatus for removing collars from compressed gas cylinders which permits removal of the collar without damaging the cylinder in any way.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 1 is a perspective view of the present apparatus for removing collars from compressed gas cylinders, shown in operative relationship to a cylinder having a collar attached thereto, a portion of which collar is broken away;

FIG. 2 is a side elevation view of the apparatus of FIG. 1, shown in use in removing the collar from a compressed gas cylinder.

DESCRIPTION OF THE PREFERRED EMBODIMENT

Figure 3:
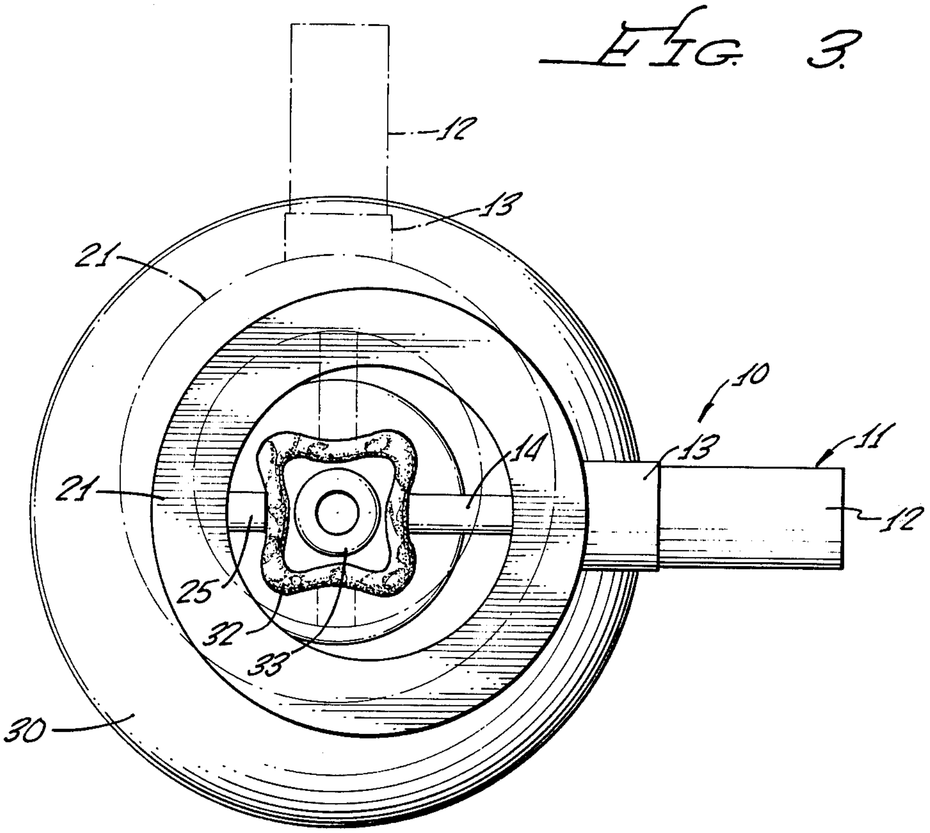
FIG. 3 is a top plan view of the apparatus and cylinder shown in FIG. 2, showing the second collapsing step, with the first collapsing step being shown in phantom.

Referring now to the drawings, the present apparatus, generally designated 10, includes a hydraulically driven tool 11 of a type well-known to those skilled in the art. Tool 11 includes an elongate, generally cylindrical housing 12 having a cylindrical collar 13 at one end thereof and a ram 14 extending axially from such one end. The other end of housing 12 is connectable via a quick-disconnect coupling 15 to a hose 16 which is connectable to a source of hydraulic power. Suitable control means, not shown, causes the flow of hydraulic fluid via hose 16 and coupling 15 into housing 12, causing ram 14 to extend axially from housing 12.

Cylindrical collar 13 is machined to provide opposed flats 17 and 18 which receive a pair of flat rings 21 and 22, respectively. Rings 21 and 22 are positioned in parallel, spaced relationship and connected to flats 17 and 18, respectively, by welding or the like.

Tool 10 includes a fixed ram 25 having the same general dimensions a driven ram 14 and which is connected to a suitable support 26 which is connected between rings 21 and 22, such as by welding. Support 26 is connected to rings 21 and 22 so that ram 25 is positioned in facing, spaced, coaxial relationship to ram 14. The dimensions of tool 10 are such that rams 14 and 25 are normally spaced by an amount slightly greater than the usual outside diameter of the cylinder collar for a compressed gas cylinder.

FIG. 1 also shows an exterior view of the top of a compressed gas cylinder 30. Cylinder 30 has a neck 31 and a cylinder collar 32 placed therearound. After collar 32 is put over neck 31, the metal on the top of cylinder 30 is swaged, as shown at 33, to lock collar 32 in place.

OPERATION

Referring now primarily to FIGS. 2 and 3, apparatus 10 may be utilized to remove collar 32 from neck 31 of cylinder 30. The diameter of rings 21 and 22 is such that tool 10 may be placed down over collar 32, to the position shown in FIG. 2, with rams 14 and 25 facing collar 32 at two points approximately 180° apart. With tool 10 so positioned, the hydraulic power source is actuated, driving ram 14 towards ram 25. The ends of rams 14 and 25 have large enough surface areas to prevent penetration of rams 14 and 25 into collar 32. Furthermore, rams 14 and 25 are of a shape such that the applied force collapses the side walls of collar 32 in the direction of the applied force and simultaneously permits elongation of the side walls of collar 32 in a direction perpendicular to the direction of the applied force. Typically, ram 14 would generate approximately 20,000 PSI. The first step is shown in phantom in FIG. 3.

The source of hydraulic power is now removed and tool 10 is rotated through an angle of 90° so that rams 14 and 25 are now facing collar 32 at two points approximately 180° apart and approximately 90° from the first two points. The hydraulic power source is then reactuated, driving ram 14 towards ram 25 and collapsing the side walls of collar 32 in a direction perpendicular to the first direction. As shown in FIG. 3, the second force squeezes back in the previously elongated portion of the side walls of collar 32, opening; up the side walls of collar 30 which were pushed in during the first hydraulic actuation. The second step frees collar 32 from cylinder neck 31.

The hydraulic source of power is now removed from tool 10, releasing collar 32 from between rams 14 and 25 and allowing the easy removal of collar 32 from neck 31 of cylinder 30. The above operation can be done in approximately 30 seconds and as can be seen, is simple to achieve. Furthermore, there is virtually no possibility of damaging cylinder 30.

While the invention has been described with respect to the preferred embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A method for removing a cylinder collar from the top of a compressed gas cylinder comprising the steps of:

applying a lateral force an first opposite sides of said collar of a magnitude sufficient to collapse the side walls of said collar in the direction of said applied force and over an area sufficient to elongate said side walls of said collar in a direction perpendicular to said direction of said applied force;

repeating the above-mentioned step on second opposite sides of said collar displaced by approximately 90° from said first sides, said second step freeing said collar from said cylinder neck; and removing said collar from said cylinder neck.

2. A method according to claim 1 wherein said force has a magnitude of at least approximately 20,000 PSI.

3. A method for removing a cylinder collar from the top of a compressed gas cylinder comprising the steps of:

providing a tool including a driven ram and a fixed ram positioned in facing, spaced, coaxial relationship to each other;

positioning said tool with the collar of said cylinder between said rams;

actuating said tool to apply a lateral force in a first direction to first opposite sides of said collar, said force being of a magnitude sufficient to collapse said collar and being applied over an area sufficient to prevent penetration of said rams into said collar while elongating said collar in a second direction approximately perpendicular to said first direction;

releasing said force;

rotating said tool through an angle of approximately 90° so that said rams are aligned with said second direction and are now facing second opposite sides of said collar which are displaced by approximately 90° from said first sides;

reactuating said tool to apply a lateral force to said second opposite sides of said collar; and releasing said force, thereby freeing said collar from said cylinder neck.

4. Apparatus for removing a cylinder collar from the top of a compressed gas cylinder consisting of:

a housing and a first driven ram extendable axially from one end of said housing;

ring-shaped support means connectable to said one end of said housing; and a second ram fixedly connected to said support means in facing, spaced, coaxial relationship to said first ram, said first ram being capable of being driven towards said second ram with a force sufficient to collapse said collar in the direction of the applied force, the areas of the facing ends of said rams being great enough to prevent penetration of said rams into said collar, the shapes of said rams being such as to elongate said collar in a direction perpendicular to said direction of said applied force, said apparatus including only said first and second rams, there being no additional rams connected to said support means to prevent elongation of said collar in said direction perpendicular to said direction of said applied force.

5. An apparatus according to claim 4 wherein said housing is adapted to be connected to a source of hydraulic power for driving said first ram.

6. An apparatus according to claim 5 wherein said first ram generates a force at least approximately equal to 20,000 PSI.

* * * * *